H. A. HANCOCK.
CLUTCH THROW-OUT.
APPLICATION FILED MAY 11, 1908.
919,006.
Patented Apr. 20, 1909.
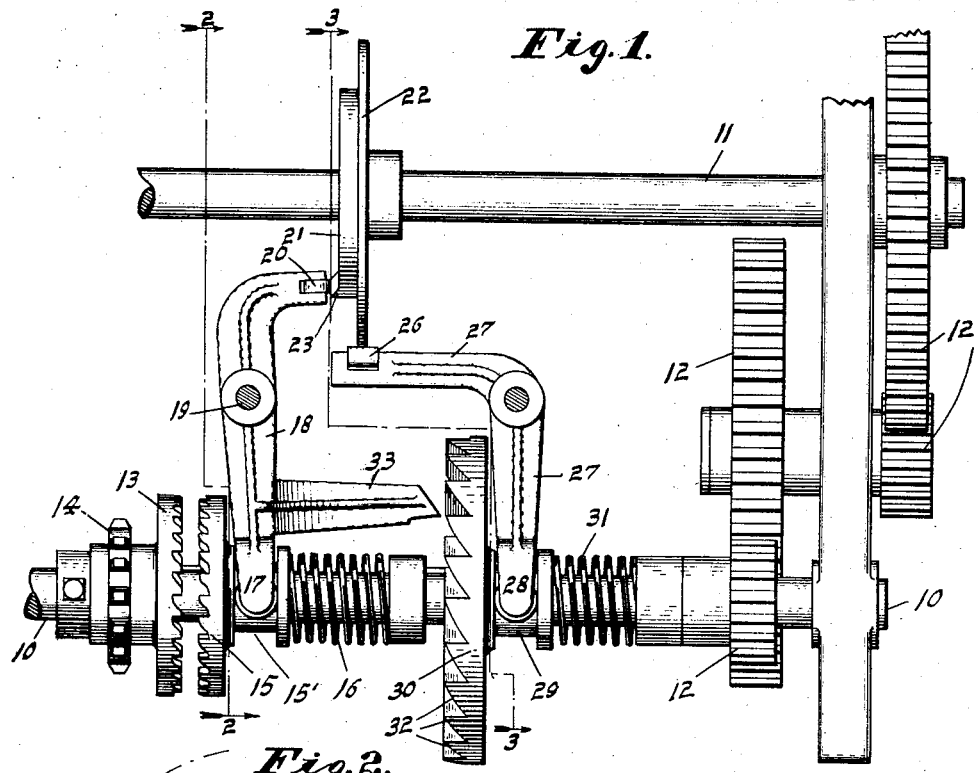
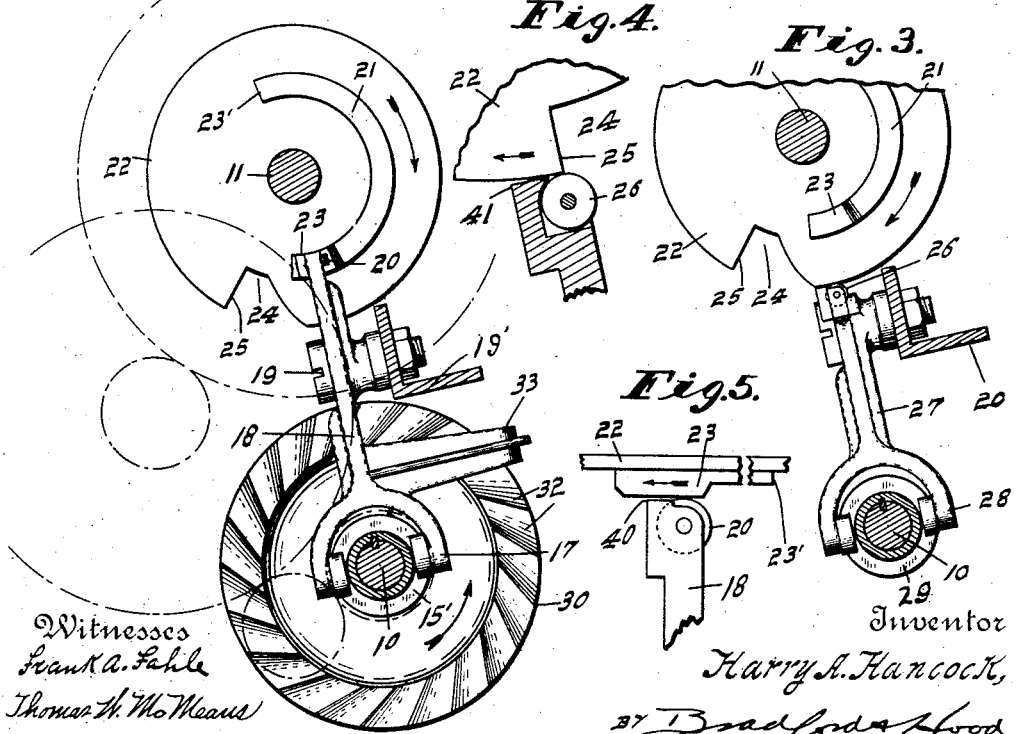
Witnesses
Frank A. Fahle
Thomas H. McMeans
Inventor
Harry A. Hancock,
By Bradford Wood
Attorneys

UNITED STATES PATENT OFFICE.

HARRY A. HANCOCK, OF INDIANAPOLIS, INDIANA.

CLUTCH THROW-OUT.

No. 919,006.  Specification of Letters Patent.  Patented April 20, 1909.

Application filed May 11, 1908. Serial No. 432,270.

*To all whom it may concern:*

Be it known that I, HARRY A. HANCOCK, a citizen of the United States, residing at Indianapolis, in the county of Marion and State of Indiana, have invented certain new and useful Improvements in Clutch Throw-Outs, of which the following is a specification.

In intermittent clutch mechanism where one member needs to be intermittently thrown out of engagement with the other, in order to stop the movement of a portion of the train, it has heretofore been quite common to provide a throwing lever and an operating cam therefor, said lever being directly connected to one of the clutch members and capable of throwing it in one direction or the other by reason of the action of the cam on the lever. In such constructions, however, a considerable angular movement of the cam is necessary in order to produce the desired movement of the clutch member, and it has been found that there are times when the clutch member is apt to only partially disengage from its fellow.

The object of my present invention is, therefore, to produce a mechanism capable of withdrawing the movable clutch member positively and at a considerable speed, the operation of such member, however, being controlled by a cam or other suitable member carried by a time shaft or other member.

The accompanying drawings illustrate my invention:

Figure 1 is a plan of an apparatus embodying my invention; Fig. 2 a transverse section on line 2 2 of Fig. 1 with the intermediate gears diagrammatically connected; Fig. 3 a section on line 3 3 of Fig. 1 with the connecting gears omitted, and Figs. 4 and 5, details of the adjacent portions of the operating cam and the levers operated thereby showing means for producing a quick movement of the cam operated levers in one direction.

In the drawings, 10 and 11 indicate a pair of shafts connected by suitable intermediate gearing 12 which may be of any desired type and arrangement. Either shaft 10 or 11 may be the driving shaft, but in the form shown shaft 10 is intended as the driving shaft. Journaled upon shaft 10 is a clutch member 13 which may be equipped with a gear or other portion 14 by means of which the intermittent rotary motion of the clutch member 13 may be transmitted to any desired member (not shown). Splined upon shaft 10 adjacent clutch member 13, so as to partake of the rotative movement of shaft 10, is a clutch member 15 adapted to be thrown into and out of mesh with the member 13. The member 15 is normally urged toward member 13 so as to engage therewith, by a spring 16, and engaging member 15 in a suitable circumferential slot 15' is the yoke end 17 of the lever 18 pivoted at 19 upon any suitable stationary frame member 19'. One arm of lever 18 is provided with a roller 20 adapted to be engaged by the cam flange 21 of cam 22 carried by shaft 11. Cam flange 21 is substantially concentric with the axis of cam 22 and is provided at one end with a short portion 23 which is somewhat higher than the main body of the cam flange, the opposite end of said cam flange ending abruptly at 23'. Cam 22 is provided in its periphery with a notch 24 having a sharp shoulder 25. Cam 22 is adapted to be engaged by a roller 26 carried by a lever 27, said lever having a yoke 28 adapted to engage in a circumferential groove 29 of the toothed throwing member 30, said member being splined upon shaft 10 so as to partake of its rotative movement and being engaged by a spring 31 which tends to hold roller 26 in engagement with the cam.

The throwing member 30 is provided upon its face with a plurality of teeth 32 any one of which is adapted to engage a finger 33 carried by lever 18, the relation between teeth 32 and the pivot 19 of finger 33 being such that, as finger 33 is swung about pivot 19 in one direction, it will be moved beyond the periphery of member 30 and hence out of engagement with any one of the teeth 32. It is desirable that one of the movements of lever 18 shall be sharp and decisive, although at general points of engagement with the cam flange 21 it is desirable to provide the antifriction roller 20. For this purpose I arrange immediately adjacent roller 20 a sharp shoulder 40 which, when roller 20 reaches the end 23' of the cam flange 21, will come into engagement with the cam flange 21 and momentarily support the lever 18 until cam 23 passes from beneath the shoulder 40 and permits the lever 18 to move suddenly under the action of spring 16. Similarly roller 26 is flanked at one side by a sharp shoulder 41.

The operation is as follows. Starting the parts in the position as shown in Figs. 1, 2 and 3, shafts 10 and 11 will be continuously rotated in the directions indicated by the arrows in Fig. 2. Almost immediately the higher portion 23 of the cam flange 21 will pass from beneath roller 20 and therefore spring 16 will serve to shift the clutch member 15 almost into engagement with member 13, finger 33 of arm 18 swinging down to a point beyond the left hand face of the throwing member 30. When shaft 11 has rotated far enough to bring the end 23' of flange 21 from beneath roller 20 said end 23' will then pass from beneath shoulder 40 whereupon lever 18 will be swung quickly in a clock-wise direction by spring 16 and clutch member 15 will be thrown quickly into engagement with clutch member 13, this movement swinging finger 33 of lever 18 farther down in front of the throwing member 30. Further rotation of shaft 11 ultimately brings the shoulder 25 of cam 22 opposite shoulder 41 of lever 27 and said lever, as well as the throwing member 30, is shifted to the left (Fig. 1) so that one of the teeth 32 thereof will engage finger 33 of lever 18 whereupon the rotation of said throwing member with shaft 10 will serve to swing lever 18 in a direction opposite to the movement produced by spring 16 so as to withdraw clutch member 15 positively from engagement with clutch member 13, the end of finger 33 sliding along the teeth 32 until it passes to the circumference of said throwing member, at which time spring 31 causes member 30 to move slightly to the left (Fig. 1) so that the tip of finger 33 will rest and slide upon the turned circumference of member 30. Thereupon the shaft 11 has rotated sufficiently to bring the portion 23 of cam flange 21 beneath roller 20 and thus swinging lever 18 slightly to raise the tip of finger 33 from the circumference of member 30. Almost immediately cam 22 engages lever 27 to move member 30 back to the position shown in Fig. 1 It will be seen that, by this arrangement, the slowly moving time-shaft merely serves to cause, at the proper time, the actuator 30, to come suddenly into position to engage finger 33 and that thereafter, moving rapidly as it does, and at the same speed as the clutch member, it will operate quickly and positively upon the lever 18 to positively withdraw the clutch member 15 from the clutch member 13; and it will also be seen that this withdrawal will take place with equal positiveness and speed at the same relative point wholly independent of any load which may be carried by the driven clutch member and tending to hold the clutch members together.

I claim as my invention:—

1. The combination of a pair of coacting clutch members, means for rotating one of said members, and means for shifting one of said members into and out of coaction with the other, said means comprising an actuator, a cam, means for operating the actuator and cam, and intermediate connections between the cam, actuator, and a clutch member for intermittently connecting the actuator and clutch member to cause a disengaging movement of said clutch member by subsequent movement of the actuator by the rotating member.

2. The combination of a pair of coacting clutch members, means for rotating one of said clutch members, and means for shifting one of said clutch members into and out of coaction with the other; said means comprising a shifting lever, a rotative actuator rotating with the clutch member, means for bringing said shifting lever and actuator into coaction to positively shift the shifting lever in one direction by such coaction, means for throwing the clutch member into engagement with its fellow, and means for intermittently preventing such movement.

3. The combination of a pair of coacting clutch members, means for rotating one of said clutch members, and means for shifting one of said clutch members into and out of coaction with the other; said means comprising a shifting lever, a rotative actuator rotating with the clutch member coaxial with the clutch member, means for bringing said shifting lever and actuator into coaction to positively shift the shifting lever in one direction by such coaction, means for throwing the clutch member into engagement with its fellow, and means for intermittently preventing such movement.

4. The combination of a pair of coacting clutch members, a rotative shaft carrying one of said members, a lever adapted to engage said last mentioned clutch member to shift the same axially on its shaft, a spring adapted to drive said clutch member axially toward its fellow, a toothed actuator splined upon said shaft, a part carried by the shifting lever and adapted to engage the teeth of said actuator, a spring adapted to drive said actuator toward engaging position, a second shifting lever adapted to engage the actuator and shift the same axially on its shaft, and a pair of cams arranged to act upon the two shifting levers, for the purpose set forth.

In witness whereof, I have hereunto set my hand and seal at Indianapolis, Indiana, this fifth day of May, A. D. one thousand nine hundred and eight.

HARRY A. HANCOCK. [L. S.]

Witnesses:
   ARTHUR M. HOOD,
   THOMAS W. McMEANS.

It is hereby certified that in Letters Patent No. 919,006, granted April 20, 1909, upon the application of Harry A. Hancock, of Indianapolis, Indiana, for an improvement in "Clutch Throw-Outs," were erroneously issued to said "Harry A. Hancock" as sole owner of said invention; whereas the said Letters Patent should have been issued to *The Brown Straw Binder Company, of Indianapolis, Indiana, a corporation of Indiana*, as owner of the entire interest in said invention, as shown by the assignments of record in this office; and that the said Letters Patent should be read with this correction therein that the same may conform to the record of the case in the Patent Office.

Signed and sealed this 11th day of May, A. D., 1909.

[SEAL.]

E. B. MOORE,
*Commissioner of Patents.*